(12) United States Patent
Gawade et al.

(10) Patent No.: US 12,420,611 B2
(45) Date of Patent: Sep. 23, 2025

(54) BYPASS FOR HEAT PUMP SYSTEMS

(71) Applicant: Rivian IP Holdings, LLC, Irvine, CA (US)

(72) Inventors: Sanjog Dilip Gawade, Irvine, CA (US); Ming Ma, Tustin, CA (US); Sushant More, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/540,701

(22) Filed: Dec. 14, 2023

(65) Prior Publication Data

US 2025/0196569 A1 Jun. 19, 2025

(51) Int. Cl.
*B60H 1/00* (2006.01)

(52) U.S. Cl.
CPC ......... *B60H 1/005* (2013.01); *B60H 1/00278* (2013.01); *B60H 2001/00307* (2013.01); *B60H 2001/00928* (2013.01)

(58) Field of Classification Search
CPC ............ B60H 1/00278; B60H 1/00899; B60H 2001/00307; B60H 2001/00928; B60H 2001/00949; B60H 2001/0015; B60H 2001/3266; B60H 2001/3258; B60H 2001/00164; F25B 2400/0415; F25B 2400/0413; F25B 43/02; F25B 43/006
See application file for complete search history.

(56) References Cited

U.S. PATENT DOCUMENTS

| 4,266,405 A * | 5/1981 | Trask | F25B 13/00 |
|---|---|---|---|
| | | | 62/503 |
| 2022/0404076 A1* | 12/2022 | Cho | F25B 43/00 |
| 2023/0182535 A1* | 6/2023 | Shey | B60H 1/00885 |
| | | | 62/160 |

FOREIGN PATENT DOCUMENTS

| EP | 3674627 A1 * | 7/2020 | F25B 43/00 |
|---|---|---|---|
| EP | 3982054 A1 * | 4/2022 | B60H 1/00278 |
| JP | 2005121242 A * | 5/2005 | F25B 41/00 |
| WO | WO-2005017423 A1 * | 2/2005 | F25B 13/00 |
| WO | WO-2018146719 A1 * | 8/2018 | F25B 13/00 |

OTHER PUBLICATIONS

JP-2005121242-A English Translation (Year: 2005).*
WO-2018146719-A1 English Translation (Year: 2018).*
WO-2005017423-A1 English Translation (Year: 2005).*

* cited by examiner

*Primary Examiner* — Frantz F Jules
*Assistant Examiner* — Devon Moore
(74) *Attorney, Agent, or Firm* — BAKERHOSTETLER

(57) ABSTRACT

Aspects of the disclosure relate to a heat pump system having a selectable bypass flow path that allows a refrigerant to bypass an accumulator of the heat pump system. The bypass flow path may be used, for example, to reduce a pressure drop in a refrigerant, and may provide a cooling boost for a passenger compartment of a vehicle, particularly in high ambient temperature and/or solar load environments and/or during fast charging of a vehicle battery.

19 Claims, 5 Drawing Sheets

BYPASS FOR HEAT PUMP SYSTEMS

INTRODUCTION

Heat pump systems are often provided in vehicles for providing heating or cooling of a passenger compartment of the vehicle.

Aspects of the subject technology can help to improve the efficiency and/or performance of heat pump systems for electric vehicles, which can help to mitigate climate change by reducing greenhouse gas emissions.

SUMMARY

Aspects of the subject disclosure relate to a heat pump system having a selectable bypass flow path that allows a refrigerant to bypass an accumulator of the heat pump system, and thereby reduce or avoid a pressure drop in the refrigerant due to the accumulator. In some examples, the bypass flow path may be used, for example, to provide a cooling boost for a passenger compartment of a vehicle, particularly in high ambient temperature environments and/or during fast charging of a vehicle battery.

In accordance with aspects of the subject technology, an apparatus is provided that includes a heat pump system, the heat pump system including a first refrigerant path from an evaporator to a compressor, the first refrigerant path passing through an accumulator; a second refrigerant path from the evaporator to the compressor, in which the second refrigerant path bypasses the accumulator; and a flow control mechanism operable to switch a flow of a refrigerant between the first refrigerant path and the second refrigerant path.

The flow control mechanism may include a three-way valve, and the three-way valve may be located at a junction between the first refrigerant path and the second refrigerant path. The flow control mechanism may include a shutoff valve, and the shutoff valve may be located along the second refrigerant path at a location separate from a junction between the first refrigerant path and the second refrigerant path.

The first refrigerant path and the second refrigerant path may diverge at a first junction on a first side of the accumulator at a location between the evaporator and the accumulator, the first refrigerant path and the second refrigerant path may recouple at a second junction on a second side of the accumulator at a location between the accumulator and the compressor, the second refrigerant path that bypasses the accumulator may merge directly with a compressor suction line for the compressor and reduce a pressure drop in the refrigerant due to the accumulator, the heat pump system may also include a check valve between an outlet of the accumulator and the second junction, and the check valve may be configured to mitigate a reverse flow into the accumulator while the refrigerant flows through the second refrigerant path.

The heat pump system may also include a third refrigerant path from a chiller for a battery through the accumulator to the compressor; and a fourth refrigerant path from an additional evaporator to the compressor. The fourth refrigerant path may combine with the first refrigerant path at a third junction between the second junction and the compressor.

The heat pump system may be implemented in a vehicle, and the flow control mechanism may be configured to switch the flow of the refrigerant from the first refrigerant path to the second refrigerant path based on an environmental condition and a mode of operation of the vehicle. The environmental condition may include an ambient temperature in an environment external to the vehicle, and the mode of operation of the vehicle may include a charging mode of the vehicle. The charging mode of the vehicle may include a fast-charging mode, and the flow control mechanism may be further configured to, periodically during the fast-charging mode, temporarily switch the flow of the refrigerant from the second refrigerant path to the first refrigerant path to facilitate oil pickup into the compressor from the accumulator.

In accordance with other aspects of the subject technology, a method is provided that includes providing a flow of a refrigerant from an evaporator, through an accumulator, to a compressor of a heat pump system via a first refrigerant path; and switching the flow of the refrigerant from the evaporator to the compressor to a second refrigerant path that bypasses the accumulator. The switching may include switching the flow of the refrigerant to the second refrigerant path responsive to an environmental condition. The heat pump system may be implemented in a vehicle, the environmental condition may include an ambient temperature in an environment of the vehicle, and the switching may also include switching the flow of the refrigerant to the second refrigerant path responsive to the environmental condition and a mode of operation of the vehicle.

The switching may include operating a three-way valve to switch the flow of the refrigerant to the second refrigerant path. The switching may include opening a shutoff valve along the second refrigerant path to switch the flow of the refrigerant to the second refrigerant path. The method may also include, following the switching: providing the flow of the refrigerant through the second refrigerant path for a period of time; and switching the flow of the refrigerant back to the first refrigerant path following the period of time. Switching the flow of the refrigerant back to the first refrigerant path following the period of time may include switching the flow of the refrigerant back to the first refrigerant path following the period of time responsive to a temperature in a passenger compartment of a vehicle falling below a threshold temperature. The method may also include, during the period of time, periodically switching the flow of the refrigerant back to the first refrigerant path through the accumulator for a second period of time that is less than the period of time. Periodically switching the flow of the refrigerant back to the first refrigerant path through the accumulator for the second period of time that is less than the period of time may include, for each of multiple periodic switches of the flow of the refrigerant back to the first refrigerant path, switching the refrigerant back to the first refrigerant path responsive to a determination that an amount of oil in the refrigerant has fallen below a threshold amount.

In accordance with other aspects of the disclosure, an electric vehicle is provided that includes a heat pump system, the heat pump system including a first refrigerant path from an evaporator to a compressor, the first refrigerant path passing through an accumulator; a second refrigerant path from the evaporator to the compressor, in which the second refrigerant path bypasses the accumulator; and a flow control mechanism operable to switch a flow of a refrigerant between the first refrigerant path and the second refrigerant path. The electric vehicle may also include a passenger compartment, and the evaporator may be configured to provide cooling for the passenger compartment when the refrigerant flows through the first refrigerant path, and to provide a boost to the cooling for the passenger compartment when the refrigerant flows through the second refrigerant path. The electric vehicle may also include a battery configured to be cooled by a portion of the refrigerant that flows through a third refrigerant path that passes through the accumulator.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to a heat pump system that includes an accumulator and a selectable bypass flow path that bypasses the accumulator. When refrigerant is rerouted around the accumulator via the bypass flow path in some modes of operation, the pressure drop in the refrigerant that occurs within the accumulator can be avoided. By reducing the pressure drop in the refrigerant, a cooling boost can be provided for one or more portions of an apparatus, such as a vehicle, that is cooled by the heat pump system.

Figure 1A:
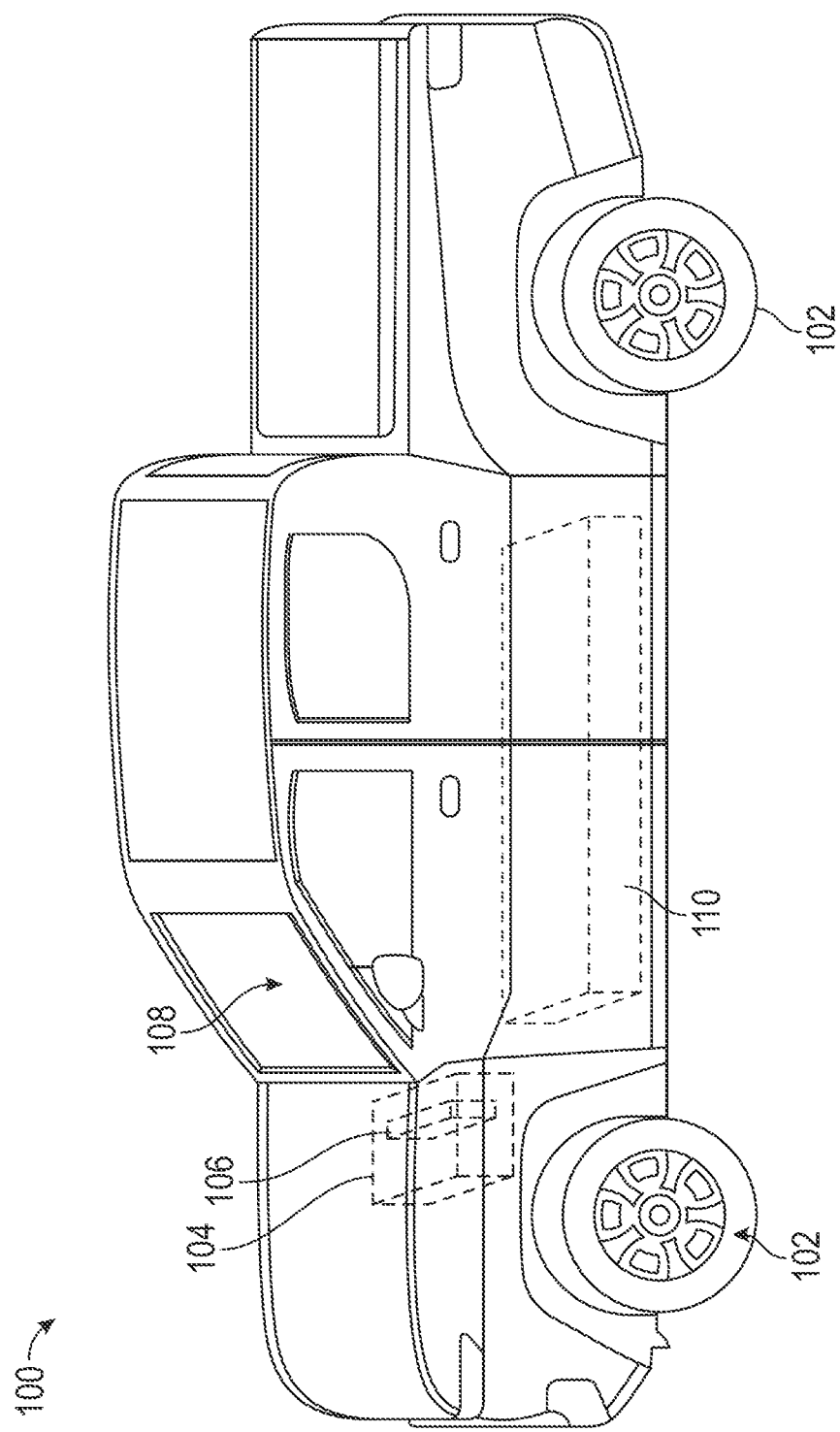
FIGS. 1A and 1B illustrate schematic perspective side views of example implementations of a vehicle having a heat pump system in accordance with one or more implementations.

FIG. 1A is a diagram illustrating an example implementation of an apparatus as described herein. In the example of FIG. 1A, the apparatus is a moveable apparatus implemented as a vehicle 100. As shown, the vehicle 100 may include one or more batteries 110. The battery 110 may include on or more battery modules, which may include one or more battery cells, or may be provided without any battery modules (e.g., in a cell-to-pack configuration).

The battery 110 may be coupled to an electrical system of the vehicle 100, to receive power for charging of the battery and/or to provide power to an electrical system of the vehicle and/or to a thermal control system, such as a heat pump system 104. As shown, the heat pump system 104 may include an accumulator 106. For example, the accumulator 106 may be configured to buffer fluids (e.g., liquid refrigerant), which could include more liquid when the heat pump system 104 is used in cooling mode and less liquid when the heat pump system 104 used in a heating mode. The accumulator 106 may also be configured to separate fluid refrigerant from vapor refrigerant and help ensure that fluid exits with a saturated status to a compressor (e.g., for compressor protection), and to store and pick up oil for compressor oil lubrication.

Various features of the heat pump system 104 is described in further detail hereinafter. In one or more implementations, the heat pump system 104 may be operated to heat and/or cool various portions and/or components of the vehicle 100, such as a passenger compartment 108, various portions thereof, the battery 110, and/or power electronics of the vehicle 100.

In one or more implementations, the vehicle 100 may be an electric vehicle having one or more electric motors that drive the wheels 102 of the vehicle using electric power from the battery 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

Figure 1B:
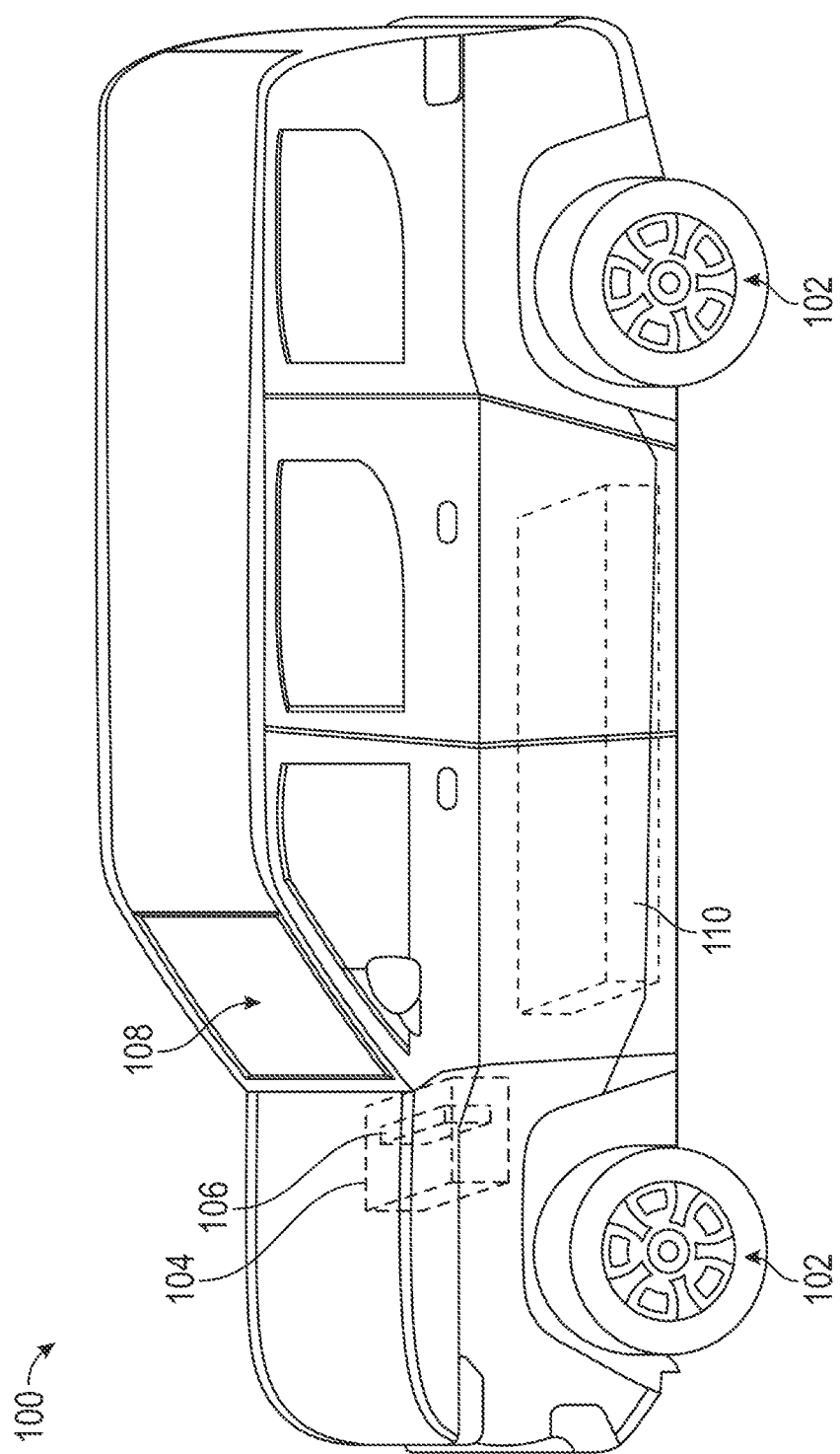

In the example of FIG. 1A, the vehicle 100 is implemented as a truck (e.g., a pickup truck) having a heat pump system 104 having an accumulator 106. However, the example of FIG. 1A in which the vehicle 100 is implemented as a pickup truck having a truck bed is merely illustrative. For example, FIG. 1B illustrates another implementation in which the vehicle 100 including the battery 110 and the heat pump system 104 including the accumulator 106 is implemented as a sport utility vehicle (SUV), such as an electric sport utility vehicle. In the example of FIG. 1B, the vehicle 100 including the battery 110 and the heat pump system 104 including the accumulator 106 may include a cargo storage area in at least a rear portion of the vehicle that is enclosed within the vehicle 100 (e.g., behind a row of seats within a cabin of the vehicle). In other implementations, the vehicle 100 may implemented as another type of electric truck, an electric delivery van, an electric automobile, an electric car, an electric motorcycle, an electric scooter, an electric passenger vehicle, an electric passenger or commercial truck, a hybrid vehicle, or other vehicles such as sea or air transport vehicles, planes, helicopters, submarines, boats, or drones, and/or any other movable apparatus having a battery 110 and a heat pump system 104 including an accumulator 106.

In one or more implementations, a heat pump system 104 as described herein may also, or alternatively, be implemented in another apparatus, such as a building (e.g., a residential home or commercial building, or any other building).

Figure 2:
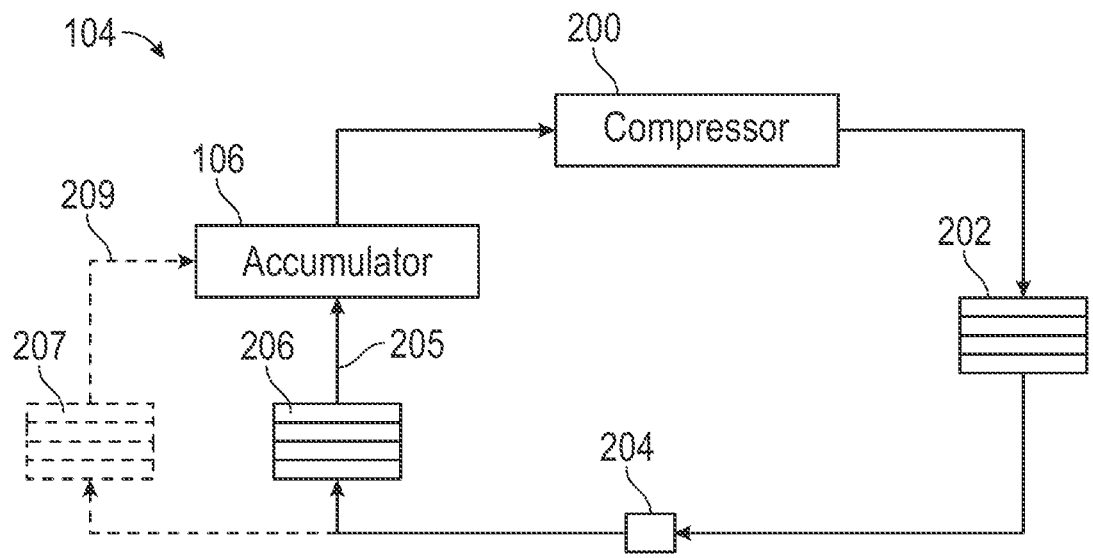
FIG. 2 illustrates a schematic diagram of an exemplary heat pump system in accordance with one or more implementations.

FIG. 2 depicts a heat pump system 104 that may be implemented in an apparatus, such as the vehicle 100 of FIG. 1A or 1B, another vehicle, and/or a building or other apparatus. As shown in FIG. 2, the heat pump system 104 may be configured as a cooling system having a compressor 200, a heat exchanger 202, an expansion valve 204, a heat exchanger 206 (e.g., that functions as an evaporator), and the accumulator 106. In the configuration of FIG. 2, the heat pump system 104 may be used as a cooling system in which high temperature vapor refrigerant is output from the compressor 200 to the heat exchanger 202, which may transfer heat from the high temperature vapor refrigerant to, for example, outside air, causing the high temperature vapor refrigerant to condense to form a warm liquid. The warm liquid may expand upon passage through the expansion valve 204 and resultingly cool to form a cool liquid refrigerant. The cool liquid refrigerant may pass through the heat exchanger 206 (e.g., that functions as an evaporator), which transfers heat from an internal environment (e.g., passenger compartment 108) or component (e.g., battery 110 or power electronics of the vehicle 100) to the refrigerant, thereby cooling the internal environment or component and causing the cool liquid to vaporize into a warm vapor (e.g., and some warm liquid in some use cases) that is passed into the accumulator 106. As described in further detail hereinafter, the accumulator 106 may help ensure that only vaporized refrigerant, mixed with a controlled amount of oil, is then passed to the compressor 200.

It is appreciated that the heat pump system 104 of FIG. 2 may be a simplified depiction of a heat pump system that may include other components and/or flow paths, such as an additional (e.g., optional) flow path, such as a third refrigerant path 209, through another heat exchanger 207 to the accumulator 106. In this arrangement including the heat exchanger 206 and heat exchanger 207, the heat pump system 104 may be able to provide simultaneous cooling for multiple portions and/or components of a vehicle (e.g., a passenger compartment and a battery, a battery and a power electronics system, a passenger compartment and a power electronics system, two separate portions of a passenger compartment, etc.) It is also appreciated that, in one or more implementations, the heat exchanger 202 may be thermally coupled to one or more other components of a vehicle or other apparatus (e.g., rather than outside air) to provide warming of the one or more other components, such as while providing cooling using the heat exchanger 206 and/or the heat exchanger 207. In one or more implementations, the heat pump system 104 of FIG. 2 may have two more selectable flow paths between the heat exchanger(s) and the compressor 200.

Figure 3:
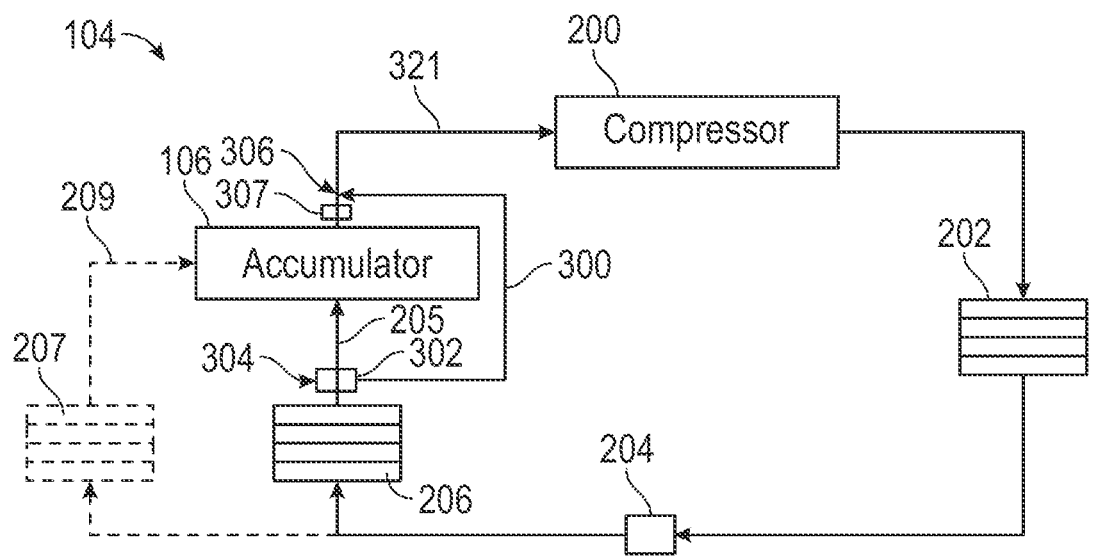
FIG. 3 illustrates a schematic diagram of an exemplary heat pump system having a bypass flow path in accordance with one or more implementations.

For example, FIG. 3 illustrates an example, in which the heat pump system 104 includes a first refrigerant path 205 from an evaporator (e.g., heat exchanger 206) to the compressor 200, the first refrigerant path passing through an accumulator 106, and a second refrigerant path 300 (e.g., a bypass flow path) from the evaporator to the compressor 200, in which the second refrigerant path 300 bypasses the accumulator 106. As shown, the heat pump system 104 may also include a flow control mechanism 302 that is operable to switch a flow of a refrigerant between the first refrigerant path 205 and the second refrigerant path 300. For example, the flow control mechanism 302 may include a component capable of selecting a flow path and/or selectively opening and/or closing a flow path there through. In one or more implementations, the flow control mechanism 302 may include, or be communicatively coupled to, control logic that determines (e.g., as described in further detail hereinafter) when to switch the flow of the refrigerant between the first refrigerant path 205 and the second refrigerant path 300.

Figure 4:
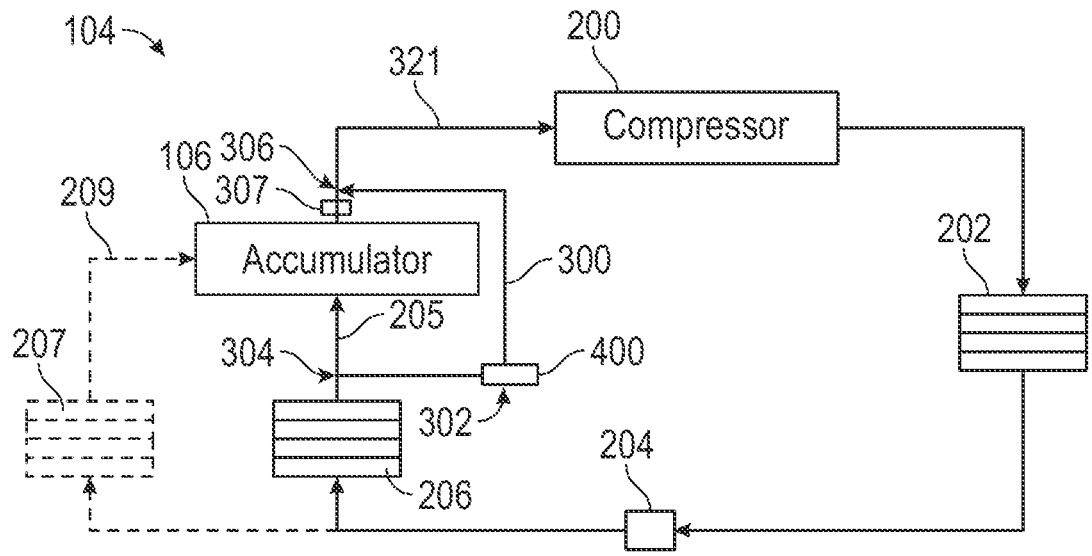
FIG. 4 illustrates a schematic diagram of another exemplary heat pump system having a bypass flow path in accordance with one or more implementations.

In the example of FIG. 3, the flow control mechanism 302 may be implemented as a three-way valve that is located at a junction 304 between the first refrigerant path 205 and the second refrigerant path 300. However, this is merely illustrative, and the flow control mechanism may be implemented using other flow control components and/or at other locations within the heat pump system 104. For example, FIG. 4 illustrates an example in which the flow control mechanism 302 is implemented as a shutoff valve 400. As shown, the shutoff valve 400 may be located along the second refrigerant path 300 at a location that is separate from the junction 304 between the first refrigerant path 205 and the second refrigerant path 300.

In either or both of the examples of FIGS. 3 and 4, the heat pump system 104 may be implemented in a vehicle, such as the vehicle 100, and the flow control mechanism 302 may be configured to switch the flow of the refrigerant from the first refrigerant path 205 to the second refrigerant path 300 based on an environmental condition and/or a mode of operation of the vehicle. For example, the environmental condition may include an ambient temperature (e.g., an ambient air temperature) in an environment external to the vehicle, and/or an internal temperature (e.g., within the passenger compartment 108 of the vehicle).

As examples, the mode of operation of the vehicle may include a charging mode of the vehicle, an occupant state of the vehicle, and/or a cooling mode of the vehicle. For example, the charging mode may be an idle mode in which the battery 110 of the vehicle 100 is not being charged, a standard charging mode in which the battery 110 of the vehicle 100 is being charged at a first rate, or a fast-charging mode (e.g., a direct current (DC) fast-charging mode) in which the battery 110 of the vehicle 100 is being charged at a second rate, higher than the first rate. The occupant state of the vehicle may include an occupied state in which one or more occupants are in the passenger compartment 108 of the vehicle, or an unoccupied state in which no occupants are in the passenger compartment 108 of the vehicle The cooling state of the vehicle may include an active cooling state in which the heat pump system 104 is being operated to cool one or more portions of the passenger compartment 108 of the vehicle (e.g., the vehicle's climate control system is on), and an inactive cooling state in which cooling of the passenger compartment 108 is inactive.

In one or more implementations, the flow control mechanism 302 may be operated to switch the flow of the refrigerant from the first refrigerant path 205 to the second refrigerant path 300 when the ambient temperature is above a temperature threshold and the vehicle 100 is in the standard charging mode or the fast-charging mode (e.g., and/or when the vehicle is in a occupied state, an active cooling mode, and/or a high internal temperature state). For example, switching the flow of the refrigerant from the first refrigerant path 205 to the second refrigerant path 300 (e.g., to bypass the accumulator 106 and avoid the pressure drop associated therewith) when the ambient temperature is above an ambient temperature threshold (e.g., eighty degrees Fahrenheit, eighty five degrees Fahrenheit, ninety degrees Fahrenheit, ninety-five degrees Fahrenheit, or one hundred degrees Fahrenheit) and the vehicle 100 is in the standard charging mode or the fast-charging mode may provide a cooling boost to a passenger compartment 108

(e.g., via the evaporator or heat exchanger 206) during a time of high heat load from the environment, and while the heat pump system 104 is also being used (e.g., via the evaporator or heat exchanger 207) to cool the battery 110 of the vehicle 100.

In an example use case, the charging mode of the vehicle may include a fast-charging mode, and the flow control mechanism 302 may be configured to, periodically during the fast-charging mode, temporarily switch the flow of the refrigerant from the second refrigerant path 300 to the first refrigerant path 205 (e.g., to facilitate oil pickup into the compressor 200 from the accumulator 106). For example, bypassing the accumulator 106 using the second refrigerant path 300 (e.g., the bypass flow path) can have the effect of depleting the oil that flows into the compressor 200 with the refrigerant. If the amount of oil in the refrigerant were to drop below a threshold percentage of the flow (e.g., below one percent or below 0.6 percent of the flow through the compressor 200), the operation of the compressor 200 could be negatively affected. Periodically and/or temporarily switching the flow of the refrigerant from the second refrigerant path 300 to the first refrigerant path 205 can raise or reset the amount of oil to a desired amount (e.g., above the threshold percentage of the flow).

As examples, periodically and/or temporarily switching the flow of the refrigerant from the second refrigerant path 300 to the first refrigerant path 205 can be performed for brief periods during an overall period of flow through the second refrigerant path 300, such as for periods of less than one minute, less than thirty seconds, or less than ten seconds (as examples), during an overall period of flow through the second refrigerant path 300 of more than ten minutes, more than twenty minutes, more than thirty minutes, or more than an hour (as examples). As another example, the brief periods may be less than ten percent, less than five percent, less than one percent, or less than a tenth of percent of the overall period of flow through the second refrigerant path 300. Periodically and/or temporarily switching the flow of the refrigerant from the second refrigerant path 300 to the first refrigerant path 205 can occur responsive to a time-based trigger or a measurement-based trigger. For example, a time-based trigger may include a passage of a maximum amount of time (e.g., ten minutes, fifteen minutes, thirty minutes) of continuous flow through the second refrigerant path 300. As examples, measurement-based trigger may include a measurement of the oil fraction in the refrigerant flow through the compressor falling below a threshold percentage, or a measurement of a proxy parameter (e.g., an inverter temperature or a refrigerant temperature) that indicates a potential oil fraction in the refrigerant flow that is below the threshold percentage.

In one or more implementations, when the internal temperature within the passenger compartment 108 drops below an internal temperature threshold (e.g., even if the ambient external temperature remains above the external temperature threshold and the vehicle remains occupied and in the fast-charging mode, such as once the passenger compartment 108 has cooled to, or within a range of, a temperature set by an occupant), the flow control mechanism 302 may be operated to switch the flow of the refrigerant back to the first refrigerant path 205 from the second refrigerant path 300. In one or more implementations, if the ambient external temperature drops below the external temperature threshold, the vehicle becomes unoccupied, and/or the vehicle exits the fast-charging mode, the flow control mechanism 302 may be operated to switch the flow of the refrigerant back to the first refrigerant path 205 from the second refrigerant path 300 (e.g., even if the interior temperature has not yet dropped below the interior temperature threshold). In this way, the switch of the flow from the first refrigerant path 205 from the second refrigerant path 300 (e.g., including the occasional, temporary, brief, and/or periodic switches back to the first refrigerant path 205 to replenish the oil in the refrigerant flow) can provide a cooling boost mode for the heat pump system 104 (e.g., for the vehicle 100), before switching back a normal cooling mode with the flow through the first refrigerant path 205.

As shown in each of FIGS. 3 and 4, the first refrigerant path 205 and the second refrigerant path 300 may diverge at a first junction 304 on a first side of the accumulator 106 (e.g., at a location between an evaporator, such as heat exchanger 206, and the accumulator 106). For example, the first junction 304 may be located at or near the outlet of the evaporator (e.g., the heat exchanger 206) of the heat pump system 104. As shown, the first refrigerant path 205 and the second refrigerant path 300 may recouple at a second junction 306 on a second side of the accumulator 106 (e.g., at a location between the accumulator 106 and the compressor 200). For example, the bypass route formed by the second refrigerant path 300 may merge directly to a compressor suction line 321 that feeds the compressor 200. For example, the second refrigerant path 300 that bypasses the accumulator 106 may merge directly with the compressor suction line 321 for the compressor 200 and may reduce a pressure drop in the refrigerant due to the accumulator 106 (e.g., a pressure drop that would otherwise occur if the refrigerant were flowing through the first refrigerant path 205 through the accumulator). As shown, the heat pump system 104 may also include a check valve 307 between an outlet of the accumulator and the second junction 306. The check valve 307 at the outlet of the accumulator bottle may help to mitigate a reverse flow (e.g., backward into the accumulator 106) when the refrigerant is flowing through the bypass route formed by the second refrigerant path 300.

Figure 5:
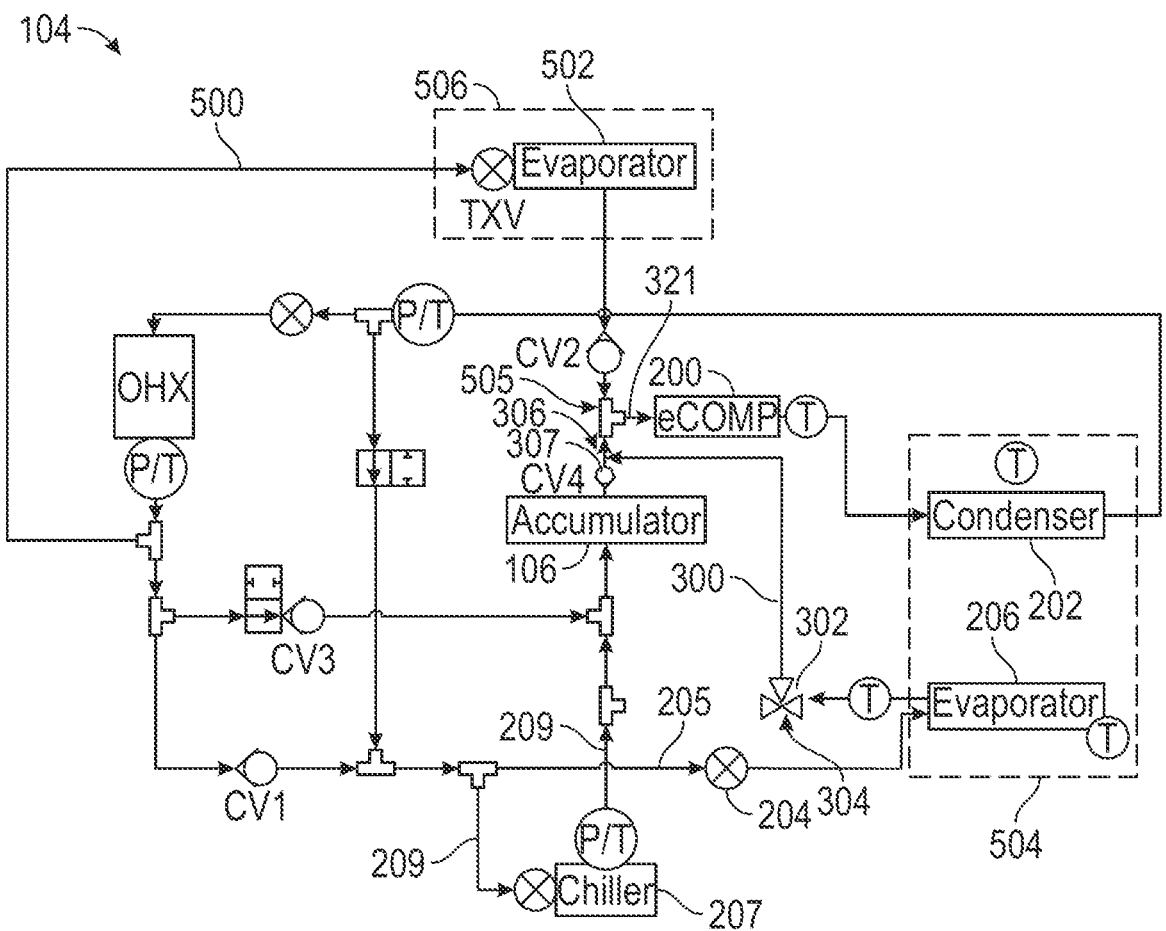
FIG. 5 illustrates a schematic diagram of another exemplary heat pump system having a bypass flow path and including operable portions for providing heating and/or cooling to two or more portions and/or components of a vehicle or other apparatus in accordance with one or more implementations.
Figure 6:
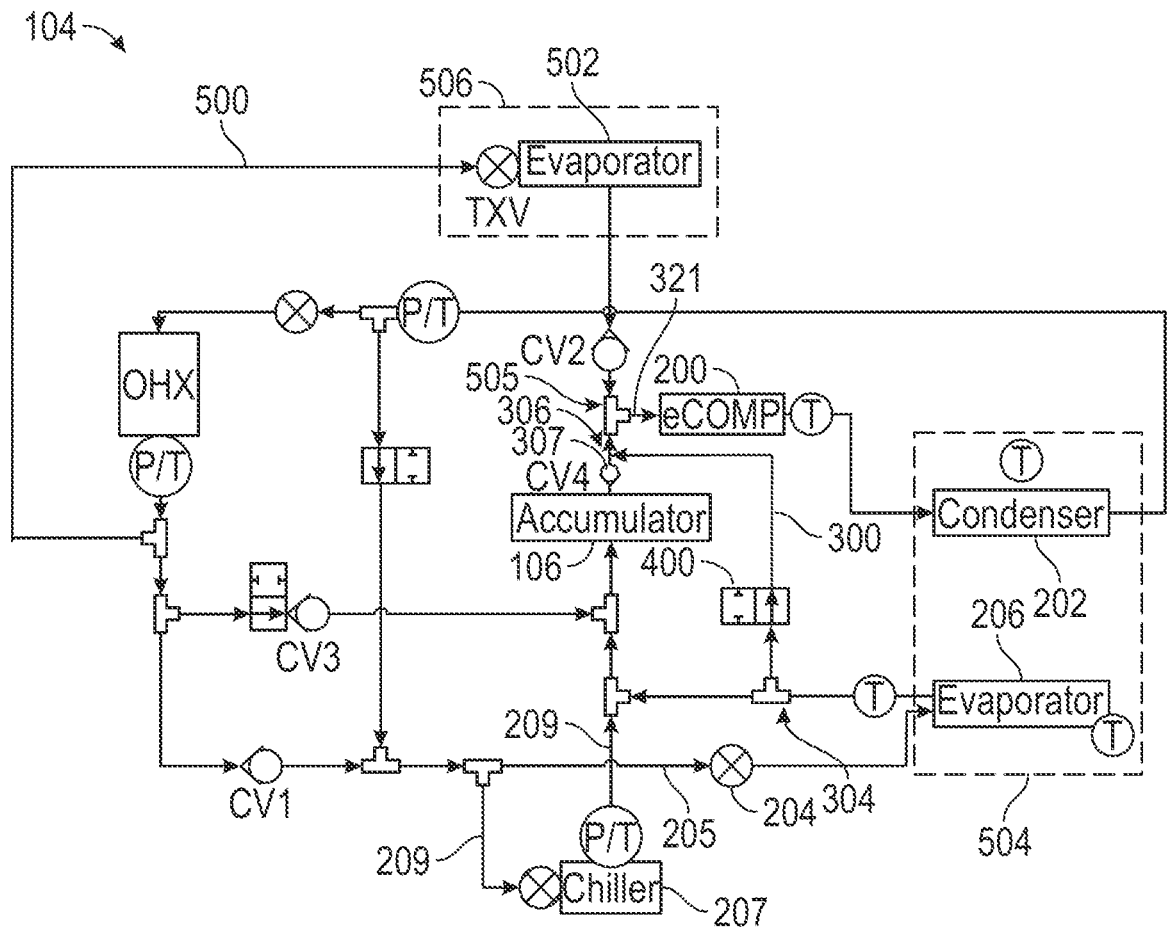
FIG. 6 illustrates a schematic diagram of another exemplary heat pump system having a bypass flow path and including operable portions for providing heating and/or cooling to two or more portions and/or components of a vehicle or other apparatus in accordance with one or more implementations.

As discussed herein, the heat pump systems 104 depicted in FIGS. 3 and 4 may be simplified versions of a heat pump system that may include one or more other components and/or flow paths. For example, FIGS. 5 and 6 illustrate additional example implementations of the heat pump system 104 including the first refrigerant path 205, the second refrigerant path 300, and the flow control mechanism 302 for switching between the first refrigerant path 205, the second refrigerant path 300. In the example of FIG. 5, the flow control mechanism 302 is implemented as a three-way valve at the location of the junction 304 as in FIG. 3. In the example of FIG. 6, the flow control mechanism 302 is implemented as a shutoff valve 400 as in FIG. 4. In each of FIGS. 5 and 6, the heat pump system 104 includes a fourth refrigerant path 500 from an additional evaporator 502 to the compressor 200. For example, the additional evaporator 502 may be configured, in one or more implementations, to provide cooling for a portion 506 of the passenger compartment 108, such as a rear portion (e.g., a second and third row of passenger seats) of the passenger compartment 108, and the heat exchanger 206 (e.g., evaporator) may be configured to provide cooling for another portion 504 of the passenger compartment 108, such as a front portion (e.g., a front or first row of passenger seats) of the passenger compartment 108.

As shown, the fourth refrigerant path 500 may combine with the first refrigerant path 205 at a third junction 505 between the second junction 306 and the compressor 200. As shown in each of FIGS. 5 and 6, the heat pump system 104 may include the third refrigerant path 209, such as from a chiller (e.g., heat exchanger 207) for a battery (e.g., battery 110) through the accumulator 106 to the compressor 200. As shown in each of FIGS. 5 and 6, the heat pump system 104 may include the fourth refrigerant path 500 from the additional evaporator 502 to the compressor 200, and the fourth refrigerant path 500 may combine with the first refrigerant path 205 (e.g., and/or with the compressor suction line 321) at a third junction 505 between the second junction 306 and the compressor 200. It is appreciated that, as shown in each of FIGS. 3, 4, 5, and 6, in one or more implementations, while the third refrigerant path 209 and the fourth refrigerant path 500 are provided, only the first refrigerant path 205 and the second refrigerant path 300 may be switchably selectable alternate flow paths.

As illustrated by the examples of FIGS. 1A, 1B, and 3-6, in one or more implementations, an electric vehicle (e.g., vehicle 100) may include a heat pump system 104 that includes a first refrigerant path 205 from an evaporator (e.g., heat exchanger 206) to a compressor 200, the first refrigerant path passing through an accumulator 106; a second refrigerant path 300 from the evaporator to the compressor 200, in which the second refrigerant path 300 bypasses the accumulator 106; and a flow control mechanism 302 (e.g., a three-way valve or a shutoff valve) operable to switch a flow of a refrigerant between the first refrigerant path 205 and the second refrigerant path 300. The electric vehicle may also include a passenger compartment 108, and the evaporator may be configured to provide cooling for the passenger compartment 108 when the refrigerant flows through the first refrigerant path 205, and to provide a boost to the cooling for the passenger compartment 108 when the refrigerant flows through the second refrigerant path 300. In one or more implementations, the electric vehicle may also include a battery 110 configured to be cooled by a portion (e.g., heat exchanger 207) of the refrigerant that flows through a third refrigerant path 209 that passes through the accumulator 106.

Figure 7:
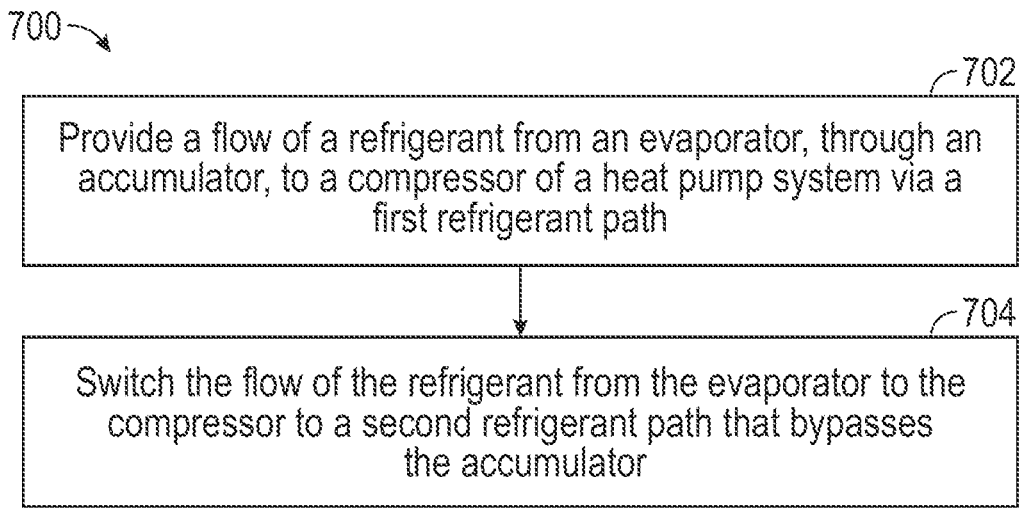
FIG. 7 illustrates a flow chart of illustrative operations that may be performed for operating a heat pump system having a bypass flow path in accordance with one or more implementations.

FIG. 7 illustrates a flow diagram of an example process for operating a heat pump system, in accordance with implementations of the subject technology. For explanatory purposes, the process 700 is primarily described herein with reference to the heat pump system 104 of FIGS. 3-6. However, the process 700 is not limited to the heat pump system 104 of FIGS. 3-6, and one or more blocks (or operations) of the process 700 may be performed by one or more other components of other suitable moveable apparatuses, devices, or systems. Further for explanatory purposes, some of the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

As illustrated in FIG. 700, at block 702, a flow of a refrigerant may be provided from an evaporator (e.g., heat exchanger 206), through an accumulator (e.g., accumulator 106), to a compressor (e.g., compressor 200) of a heat pump system (e.g., heat pump system 104) via a first refrigerant path (e.g., first refrigerant path 205).

At block 704, the flow of the refrigerant from the evaporator to the compressor may be switched to a second refrigerant path (e.g., second refrigerant path 300) that bypasses the accumulator. For example, the switching may include switching the flow of the refrigerant to the second refrigerant path responsive to an environmental condition. For example, the heat pump system may be implemented in a vehicle (e.g., vehicle 100), and the environmental condition may include an ambient temperature in an environment of the vehicle (e.g., an ambient temperature, external to the vehicle, that is above an ambient temperature threshold). In one or more implementations, the switching may also include switching the flow of the refrigerant to the second refrigerant path responsive to the environmental condition and a mode of operation of the vehicle. As examples, the mode of operation of the vehicle may include a charging mode of the vehicle (e.g., a fast-charging mode, such as a DC fast-charging mode), an occupant state of the vehicle, and/or a cooling mode of the vehicle, as discussed herein.

In one or more implementations, the switching may include operating a three-way valve (e.g., flow control mechanism 302) to switch the flow of the refrigerant to the second refrigerant path. In one or more implementations, the switching may include opening a shutoff valve (e.g., shutoff valve 400) along the second refrigerant path to switch the flow of the refrigerant to the second refrigerant path.

In one or more implementations, the process 700 may also include, following the switching: providing the flow of the refrigerant through the second refrigerant path for a period of time; and switching the flow of the refrigerant back to the first refrigerant path following the period of time. For example, switching the flow of the refrigerant back to the first refrigerant path following the period of time may include switching the flow of the refrigerant back to the first refrigerant path following the period of time responsive to a temperature in a passenger compartment of a vehicle falling below a threshold temperature (e.g., an interior temperature threshold, such as threshold of seventy five degrees Fahrenheit or eighty degrees Fahrenheit, or a user-selected temperature for the interior of the passenger compartment).

In one or more implementations, the process 700 may also include, during the period of time, periodically switching the flow of the refrigerant back to the first refrigerant path through the accumulator for a second period of time that is less than the period of time. For example, periodically switching the flow of the refrigerant back to the first refrigerant path through the accumulator for the second period of time that is less than the period of time may include, for each of multiple periodic switches (e.g., during the first period of time) of the flow of the refrigerant back to the first refrigerant path, switching the refrigerant back to the first refrigerant path responsive to a determination that an amount of oil in the refrigerant has fallen below a threshold amount. As examples, determining that the amount of oil in the refrigerant has fallen below the threshold amount may include determining that the amount of oil in the refrigerant has fallen below the threshold amount based on a length of the period of time, based on a measured amount of oil, and/or based on a measured proxy parameter (e.g., refrigerant temperature, inverter temperature, or the like) that can be used to derive or infer the amount of oil.

As discussed herein, providing a heat pump system 104 with a bypass route that includes a flow control component (e.g., a three-way valve or a shutoff valve) and an additional refrigerant line (e.g., second refrigerant path 300) at the evaporator outlet (e.g., the outlet of the evaporator corresponding to heat exchanger 206) that bypasses the accumulator 106 and merges directly to the compressor suction line (e.g., as described herein in connection with FIGS. 3-7) may reduce, mitigate, or avoid the refrigerant pressure drop caused by the accumulator 106, and can boost cooling performance, including under hot weather conditions. In this way, the disclosed heat pump systems can achieve a reduced or minimum refrigerant pressure drop between evaporator and compressor, and boost cooling performance for maintaining cabin comfort and DC fast-charging (DCFC), including under hot weather conditions.

The disclosed cooling boost may help enable cooling for vehicles with a larger cabin size (e.g., three rows of passenger seats), such as by boosting cabin cooling performance and maintaining cabin comfort under hot ambient and/or high solar load conditions while driving, idling, and/or DC fast charging, which can provide improved cooling efficiency, and may also help improve occupant comfort, safety, experience, and satisfaction.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order.

It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
  a heat pump system comprising:
    a first refrigerant path from an evaporator to a compressor, the first refrigerant path passing through an accumulator;
    a second refrigerant path from the evaporator to the compressor, wherein the second refrigerant path bypasses the accumulator;
    a flow control mechanism operable to switch a flow of a refrigerant between the first refrigerant path and the second refrigerant path; and
    control logic configured to operate the flow control mechanism, based on an environmental condition and a charging mode of a vehicle, to switch the flow of the refrigerant between the first refrigerant path and the second refrigerant path.

2. The apparatus of claim 1, wherein the flow control mechanism comprises a three-way valve, and wherein the three-way valve is located at a junction between the first refrigerant path and the second refrigerant path.

3. The apparatus of claim 1, wherein the flow control mechanism comprises a shutoff valve, and wherein the shutoff valve is located along the second refrigerant path at a location separate from a junction between the first refrigerant path and the second refrigerant path.

4. The apparatus of claim 1, wherein the first refrigerant path and the second refrigerant path diverge at a first junction on a first side of the accumulator at a location between the evaporator and the accumulator, wherein the first refrigerant path and the second refrigerant path recouple at a second junction on a second side of the accumulator at a location between the accumulator and the compressor, wherein the second refrigerant path that bypasses the accumulator merges directly with a compressor suction line for the compressor and reduces a pressure drop in the refrigerant due to the accumulator, wherein the heat pump system further comprises a check valve between an outlet of the accumulator and the second junction, and wherein the check valve is configured to mitigate a reverse flow into the accumulator while the refrigerant flows through the second refrigerant path.

5. The apparatus of claim 1, wherein the heat pump system is implemented in the vehicle.

6. The apparatus of claim 4, wherein the heat pump system further comprises:
  a third refrigerant path from a chiller for a battery through the accumulator to the compressor; and
  a fourth refrigerant path from an additional evaporator to the compressor, wherein the fourth refrigerant path combines with the first refrigerant path at a third junction between the second junction and the compressor.

7. The apparatus of claim 5, wherein the environmental condition comprises an ambient temperature in an environment external to the vehicle.

8. The apparatus of claim 7, wherein the charging mode of the vehicle comprises a fast-charging mode, and wherein the flow control mechanism is further configured to, periodically during the fast-charging mode, temporarily switch the flow of the refrigerant from the second refrigerant path to the first refrigerant path to facilitate oil pickup into the compressor from the accumulator.

9. A method, comprising:
  providing a flow of a refrigerant from an evaporator, through an accumulator, to a compressor of a heat pump system via a first refrigerant path; and
  switching, by control logic based on an environmental condition and a charging mode of a vehicle, the flow of the refrigerant from the evaporator to the compressor to a second refrigerant path that bypasses the accumulator.

10. The method of claim 9 wherein the heat pump system is implemented in the vehicle, and wherein the environmental condition comprises an ambient temperature in an environment of the vehicle.

11. The method of claim 9, wherein the switching comprises operating a three-way valve to switch the flow of the refrigerant to the second refrigerant path.

12. The method of claim 9, wherein the switching comprises opening a shutoff valve along the second refrigerant path to switch the flow of the refrigerant to the second refrigerant path.

13. The method of claim 9, further comprising, following the switching:
  providing, by the control logic, the flow of the refrigerant through the second refrigerant path for a period of time; and
  switching, by the control logic, the flow of the refrigerant back to the first refrigerant path following the period of time.

14. The method of claim 13, wherein switching the flow of the refrigerant back to the first refrigerant path following the period of time comprises switching, by the control logic, the flow of the refrigerant back to the first refrigerant path following the period of time responsive to a temperature in a passenger compartment of a vehicle falling below a threshold temperature.

15. The method of claim 14, further comprising, by the control logic and during the period of time, periodically switching the flow of the refrigerant back to the first refrigerant path through the accumulator for a second period of time that is less than the period of time.

16. The method of claim 15, wherein periodically switching the flow of the refrigerant back to the first refrigerant path through the accumulator for the second period of time that is less than the period of time comprises, for each of multiple periodic switches of the flow of the refrigerant back to the first refrigerant path, switching the refrigerant back to the first refrigerant path responsive to a determination that an amount of oil in the refrigerant has fallen below a threshold amount.

17. An electric vehicle, comprising:
  a heat pump system, comprising:
    a first refrigerant path from an evaporator to a compressor, the first refrigerant path passing through an accumulator;
    a second refrigerant path from the evaporator to the compressor, wherein the second refrigerant path bypasses the accumulator;
    a flow control mechanism operable to switch a flow of a refrigerant between the first refrigerant path and the second refrigerant path; and
    control logic configured to operate the flow control mechanism, based on an environmental condition and a charging mode of the electric vehicle, to switch the flow of the refrigerant between the first refrigerant path and the second refrigerant path.

18. The electric vehicle of claim 17, further comprising a passenger compartment, and wherein the evaporator is configured to provide cooling for the passenger compartment when the refrigerant flows through the first refrigerant path, and to provide a boost to the cooling for the passenger compartment when the refrigerant flows through the second refrigerant path.

19. The electric vehicle of claim 18, further comprising a battery configured to be cooled by a portion of the refrigerant that flows through a third refrigerant path that passes through the accumulator.

* * * * *